May 12, 1970          A. H. DUNLAP          3,511,520
THRUST-POLE PROPELLED TRICYCLE
Filed March 22, 1968
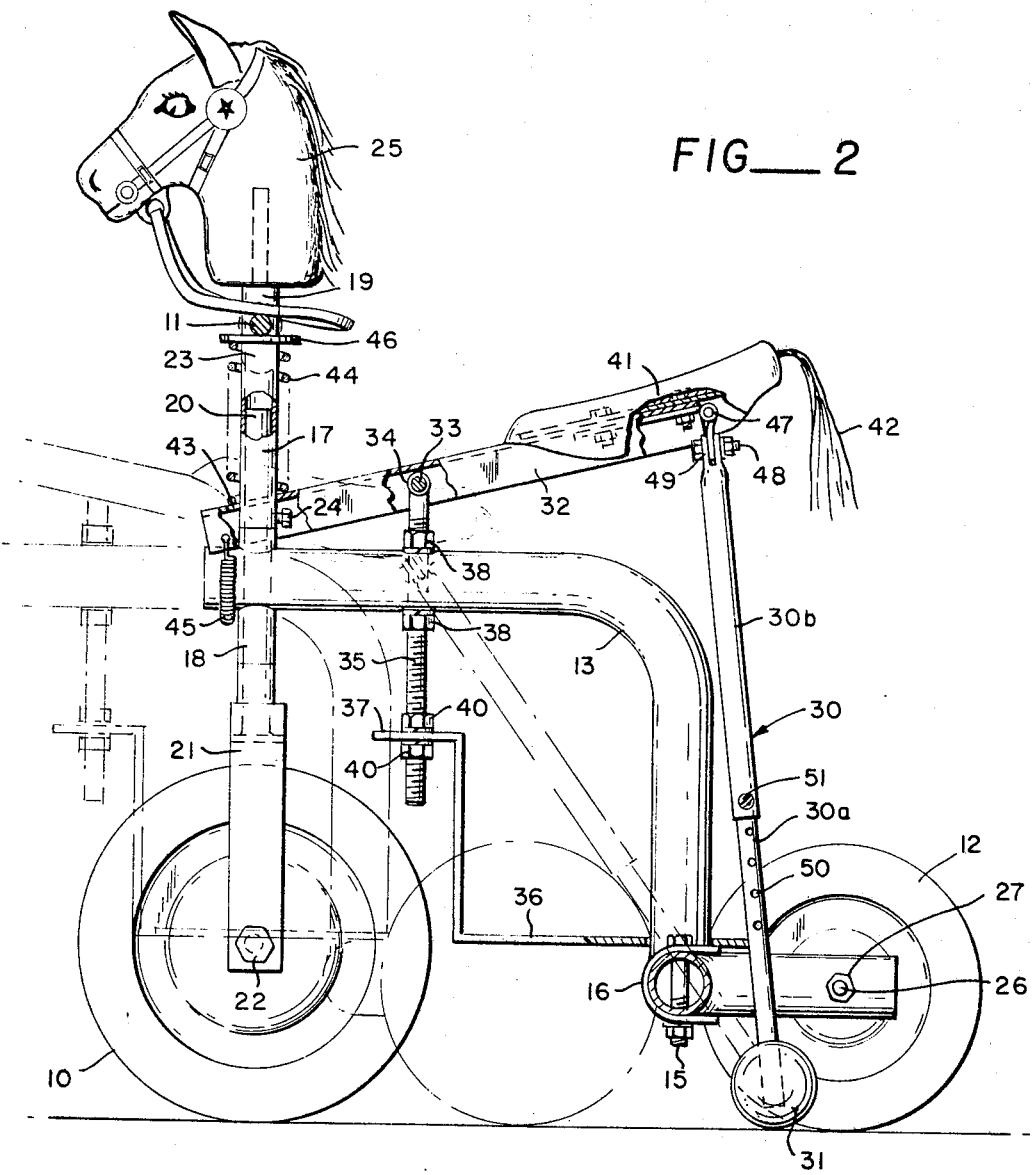
FIG__2
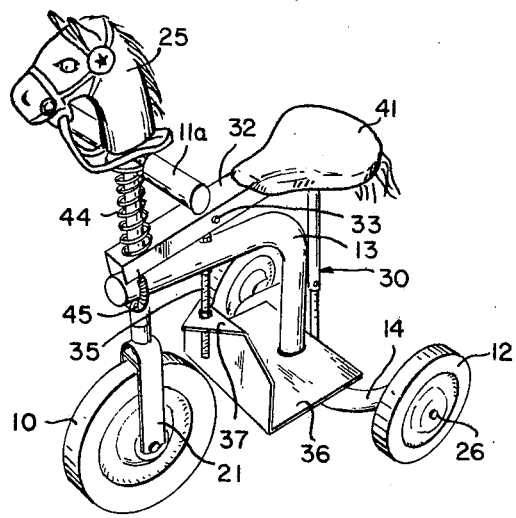
FIG__1
INVENTOR.
ARTHUR H. DUNLAP
BY Seed, Berry, Dowrey
ATTORNEYS 3,511,520
THRUST-POLE PROPELLED TRICYCLE
Arthur H. Dunlap, 24057 Crystal Lake Road,
Woodinville, Wash. 98072
Filed Mar. 22, 1968, Ser. No. 715,273
Int. Cl. B62m 29/00; A63f 19/00
U.S. Cl. 280—219                                  7 Claims

ABSTRACT OF THE DISCLOSURE

A tricycle which has its seat mounted on the rear of a centrally pivoted beam so that as the rider pushes down on the seat in opposition to a return spring at the front, a pivoted thrust pole at the rear of the beam is urged against the ground and propels the vehicle forwardly.

This invention relates to a vehicle for children which is propelled by action of the rider raising up and sitting down to simulate riding a horse. More particularly the invention relates to a tricycle type vehicle having its propulsion accomplished by reaction of a thrust pole against the ground behind the vehicle.

The invention aims to provide such a vehicle which is of simple, durable and economical construction, easy and safe to operate, pleasing to children, and which is a good exerciser.

A further object is to provide such a vehicle which can be operated both indoors and outdoors.

Other more particular objects and advantages of the invention will, with the foregoing, appear and be understood in the course of the following description and claims, the invention consisting in the novel construction and in the adaptation and combination of parts hereinafter described and claimed.

In the accompanying drawings:

FIG. 1 is a perspective view of a tricycle embodying the present invention; and

FIG. 2 is a side elevational view to an enlarged scale and partly in vertical section of the tricycle.

Referring to the drawings it is seen that the tricycle of the present invention is conventional in the sense of having a front steerable wheel 10 turned by action of a pair of handle bars 11 and having a pair of rear wheels 12 journaled on a common transverse axis. The basic frame for the vehicle comprises tubular L-shaped and U-shaped pieces 13 and 14, respectively, of tubular stock which are connnected together at the center of the U-piece by bolts 15 passing through the flanges of a coupling saddle 16 in turn welded at the lower rear end of the L-piece.

At its forward end the L-piece 13 has a pair of vertical oppositely projecting boses 17–18 serving as a steering column for a steering post 20 which is fixed at the top of a fork 21 for supporting the axle 22 of the front wheel 10. The handle bars 11 have hand grips 11a and are fixed to a center sleeve 23 fitting over the steering post 20 and connected thereto by a set screw 24. A simulated pony head 25 is detachably mounted on a post extension atop the handle bar boss 23.

The rear wheels 12 are journaled on respective axle bolts 26 which pass transversely through the free end portions of the rearwardly extending tubular arms of the U-piece 14 and project laterally to receive the wheels. In this manner the heads of the axle bolts retain the wheels 12 and the axle bolts are in turn each retained by a nut 27 on its inner end and a respective lock nut located within the respective tubular arm. The resulting open space between the rear wheels is provided for the operation of a thrust pole 30 having a ball 31 at its lower end and making a universal connection at the top to a rocking beam 32. This beam may be of channel section and is pivoted intermediate its ends by a transverse bolt 33 passing through a hollow T-head 34 fixed at the top of an elongated bolt 35 which passes downwardly through alined openings in the L-piece 13 and carries the forward end of a foot rest 36. This foot rest sets at the rear on the U-piece 14 and has a rear center opening for passage of the L-piece 13. At the front the foot rest bends upwardly behind the front wheel and then bends forwardly horizontally by a center tongue 37 through which the bolt 35 extends. Two pairs of nuts 38—38 and 40—40 are threaded onto the bolt 35, the upper pair setting the distance of the T-head 34 above the L-piece 13 and the lower pair fixing the front of the foot rest 36 beneath the L-piece.

A seat 41 is mounted on the rear end of the rocking beam 32 and has a simulated pony tail 42. At its forward end the beam has an oblong hole 43 receiving the upper boss 17 of the steering column and is yieldingly urged downwardly at the front by a compression spring 44. This spring is sleeved on the boss 17 and bears at the top against a seat 46 fixed on the handle bar assembly. A tension spring 45 looped over the forward end of the L-piece 13 and connected at the sides of the beam may be provided to augment the action of the spring 44.

The universal connection between the thrust pole 30 and the rocking beam 32 may be provided by a leaf hinge 47 having one of its leaves connected to the beam and the other connected by a pivot pin 48 to a forked head 49 on the pole. To permit height adjustment of the seat 41 the thrust pole is made telescopic. The lower telescopic section 30a has a series of adjusting holes 50 to selectively receive a bolt 51 passing through transverse holes at the lower end of the upper telescopic section 30b. The ball 31 at the lower end of the pole is preferably rubber and is press-fitted in position by way of a radial bore somewhat smaller in diameter than the outside diameter of the lower section 30a of the pole.

To raise the position of the seat 41, the sets of nuts 38 and 40 are loosened to permit the T-head 34 to be further raised relative to the L-piece 13 of the frame and then are retightened. The end result is a lowering of the nuts 38 and 40 relative to the bolt 35 to raise the seat. After the seat has been adjusted to the desired height the length of the thrust pole is adjusted so as to barely clear the ground level of the wheels when the seat is in an unoccupied at rest position.

To operate the vehicle the child straddles the rocking beam with his feet placed on the foot rest 36 and then raises up and down onto the seat 41. As the rider applies his weight onto the seat the beam is rocked downwardly at the rear in opposition to the springs 44–45 and the thrust pole is urged against the ground and caused to swing forwardly with the ball 31 serving as a fulcrum at the bottom. Consequently the vehicle is forced ahead as indicated by the broken line position in FIG. 2 until the spring 44 is fully compressed or the rider lifts his weight from the seat. At any rate when the rider again raises up from the seat the springs 44–45 return the seat to its raised position and thereupon permit the thrust pole to swing back freely at the bottom against the back edge of the foot rest ready for another forward thrust.

The universal joint at the top of the thrust pole 30 assures effective operation even when the vehicle is in a tight turn. For example, when a left turn is being made with the vehicle swinging substantially about its left wheel as a fulcrum, the longitudinal center line of the tricycle swings to the right of the point of contact of the thrust pole with the ground; i.e. the lower end of the thrust pole (the ball 31) moves to the left relatively speaking, out of a position midway between the rear wheels 12 as the left turn progresses and weight is applied to the seat 41. The universal joint 47, 48 is also of assistance in obtaining effective propulsion on irregular ground surfaces or slopes.

It is believed that the invention will have been clearly understood from the foregoing detailed description of my now-preferred illustrated embodiment. Changes in the details of construction may be restorted to without departing from the spirit of the invention and it is accordingly my intention that no limitations be implied and that the thereto annexed claims be given the broadest interpretation to which the employed language fairly admits.

The embodiments of the invention in which an exclusive property or privilege is claimed are defined as follows:

1. A vehicle comprising, a frame assembly with a steering post journaled at the front and a pair of laterally spaced wheels journaled at the rear, a handle at the top of the steering post and a front wheel assembly mounted at the bottom of the steering post, a longitudinal beam pivotally mounted at a fulcrum intermediate its ends on the frame assembly to seesaw, a seat on the rear of the beam, return spring means yieldingly urging the forward end of the beam downwardly, a foot rest below the beam in the frame assembly, a thrust pole having a pivotal connection at the rear of the beam and depending between the rear wheels to be forced against the ground and thereby propel the vehicle forwardly when the rear of the beam swings downwardly in opposition to said spring means responsive to a rider sitting on the seat, said frame assembly including a central longitudinal frame member directly below said beam and an elongated bolt extending downwardly through said frame member and supporting the front of said footrest.

2. A vehicle according to claim 1 in which said elongated bolt also projects above said frame member and has said beam fulcrum at its uper end.

3. A vehicle according to claim 1 in which said front of the foot rest is adjustable along said elongated bolt.

4. A vehicle comprising a frame assembly with a steering post journaled at the front and a pair of laterally spaced wheels journaled at the rear, a handle at the top of the steering post and a front wheel assembly mounted at the bottom of the steering post, a longitudinal beam pivotally mounted at a fulcrum intermediate its ends on the frame assembly to seesaw, a seat on the rear of the beam, return spring means yieldably urging the forward end of the beam downwardly, a foot rest below the beam in the frame assembly, a thrust pole having a pivotal connection at the rear of the beam and depending between the rear wheels to be forced against the ground and thereby propel the vehicle forwardly when the rear of the beam swings downwardly in opposition to said spring means responsive to a rider sitting on the seat, said assembly including a central longitudinal frame member directly below said beam, and an elongated bolt vertically adjustable relative to said longitudinal frame member and having said beam fulcrum at its upper end whereby the level of said beam fulcrum relative to said frame member is adjustable to thereby adjust the height of said seat.

5. A vehicle according to claim 4 in which said thrust pole is adjustable in length and has a universal type of connection with said beam.

6. A vehicle comprising a frame assembly having a longitudinal frame member with a steering post journaled at the front and a pair of laterally spaced wheels journaled at the rear, a handle at the top of the steering post and a front wheel assembly mounted at the bottom of the steering post, a longitudinal beam pivotally mounted at a fulcrum intermediate its ends on the longitudinal frame member and rearwardly of said steering post, a seat on said longitudinal beam, return spring means encircling the steering post and yieldably urging the forward end of the beam downwardly, said longitudinal beam having a lost motion connection at its forward end with said steering post, and a thrust pole having a pivotal connection at the rear of the beam and depending between the rear wheels to be forced against the ground and thereby propel the vehicle when the rear of the beam swings downwardly in opposition to said spring means responsive to a rider sitting on the seat.

7. A vehicle comprising a frame assembly having a longitudinal frame member with a steering post journaled at the front end and a pair of laterally spaced wheels journaled at the rear, a handle at the top of the steering post and a front wheel assembly mounted at the bottom of the steering post, a longitudinal beam pivotally mounted at a fulcrum on said longitudinal frame member, return spring means yieldably urging the rear end of the beam upwardly, a seat on said longitudinal beam, a thrust pole having a pivotal connection at the rear of the beam and depending between the rear wheels to be forced against the ground and thereby propel the vehicle when the rear of the beam swings downwardly in opposition to said spring means responsive to a rider sitting on the seat, said thrust pole having means for adjusting its length, and said beam being vertically adjustably mounted relative to said longitudinal frame member so that the height of said seat may be adjusted and such adjustment compensated for by a corresponding adjustment in the length of said thrust pole.

References Cited

UNITED STATES PATENTS

| 185,653 | 12/1876 | Swett. | |
| 1,273,290 | 7/1918 | Van Aken | 280—219 |
| 1,313,157 | 8/1919 | Arney | 280—219 |
| 1,330,951 | 2/1920 | Oelhafen | 280—219 |
| 1,347,099 | 7/1920 | Howes | 280—1.196 X |
| 1,441,918 | 1/1923 | Griswold | 280—1.188 X |
| 1,592,036 | 7/1926 | Merriman | 280—1.188 |
| 1,677,061 | 7/1928 | Toman | 280—226 X |
| 1,887,791 | 11/1932 | Sperry | 280—226 |
| 2,216,426 | 10/1940 | Willcox | 280—1.196 X |

FOREIGN PATENTS

| 539,829 | 4/1922 | France. |
| 1,133,092 | 11/1956 | France. |

LEO FRIAGLIA, Primary Examiner

U.S. Cl. X.R.

280—1.188, 1.196, 1.202, 226